United States Patent [19]

Swanson

[11] Patent Number: 4,807,265
[45] Date of Patent: Feb. 21, 1989

[54] RECREATION VEHICLE DISTANCE MEASURING DEVICE

[76] Inventor: Carl S. Swanson, P.O. Box 4251, Brownsville, Tex. 78523

[21] Appl. No.: 92,866

[22] Filed: Sep. 3, 1987

[51] Int. Cl.⁴ .............................................. G01C 22/00
[52] U.S. Cl. .................................. 377/24.1; 377/24.2; 377/32
[58] Field of Search ....................... 377/24.1, 24.2, 24, 377/32; 364/707

[56] References Cited

U.S. PATENT DOCUMENTS

| | | | |
|---|---|---|---|
| 3,865,305 | 2/1975 | Sampey | 377/24.1 |
| 3,941,989 | 3/1976 | McLaughlin et al. | 364/707 |
| 3,955,185 | 5/1976 | Nishimura | 364/707 |
| 4,044,471 | 8/1977 | Peterson | 377/24.2 |
| 4,053,749 | 10/1977 | Shinoda et al. | 377/24.1 |
| 4,053,755 | 10/1977 | Sherrill | 377/24.2 |
| 4,071,892 | 1/1978 | Genzling | 377/24.2 |
| 4,156,190 | 5/1979 | Chittenden et al. | 377/24.2 |
| 4,176,397 | 11/1979 | Crom et al. | 377/24.1 |
| 4,197,748 | 4/1980 | Stenehjem | 377/24.1 |
| 4,328,413 | 5/1982 | O'Neil et al. | 377/24.1 |
| 4,334,149 | 6/1982 | Furuta | 377/32 |
| 4,417,135 | 11/1983 | Motoyama et al. | 377/24 |
| 4,532,710 | 8/1985 | Kinney et al. | 377/24.2 |
| 4,559,637 | 12/1985 | Weber | 377/24.1 |
| 4,680,454 | 7/1987 | Zeaman et al. | 235/95 |

Primary Examiner—John S. Heyman
Attorney, Agent, or Firm—Diller, Ramik & Wight

[57] ABSTRACT

A distance measuring device that can be easily retrofit to a recreational vehicle includes a sensor unit that easily attaches to the wheel of the vehicle, a counter unit (12) for processing the sensor signals, a display unit (13) for providing a numeric display of the distance traveled, a reset unit (14) for allowing the vehicle operator to reset the count to zero and to initiate a timing cycle, during which timing cycle movement of the vehicle must either start or continue, and a time limit unit (16) for automatically resetting the timing cycle to lengthen the cycle under appropriate circumstances. The timing cycle will terminate when no sensor signals are received during the timing cycle, and as a result, the counting circuits and the sensor will be driven low to clear memory and preserve power.

12 Claims, 2 Drawing Sheets

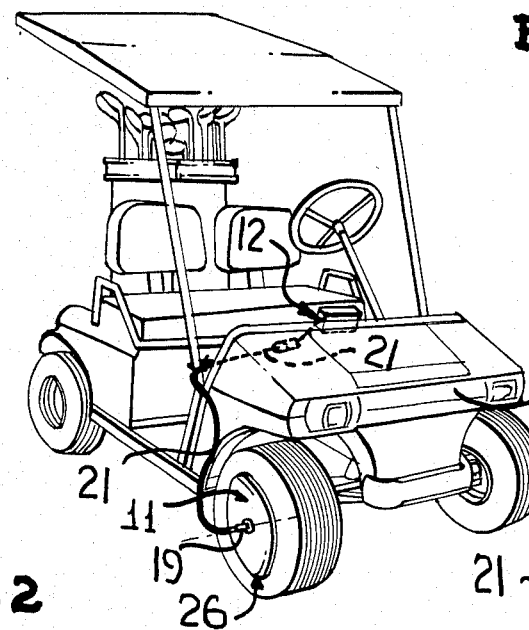
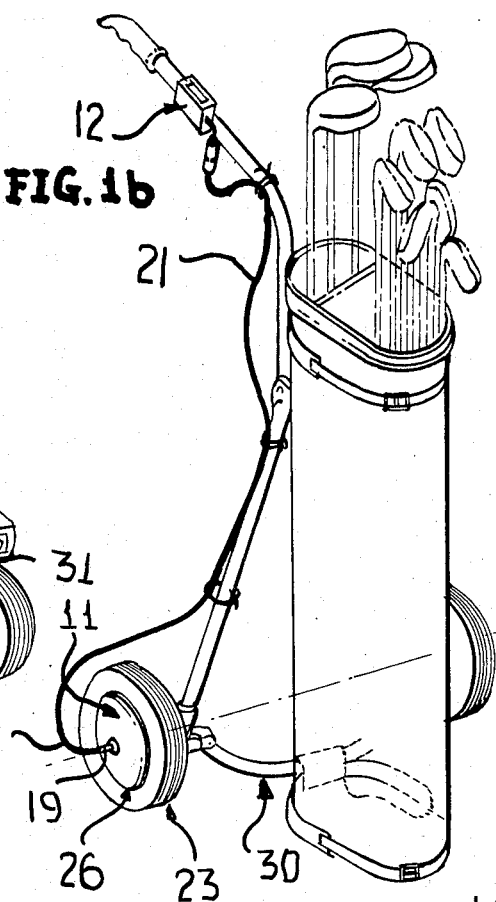
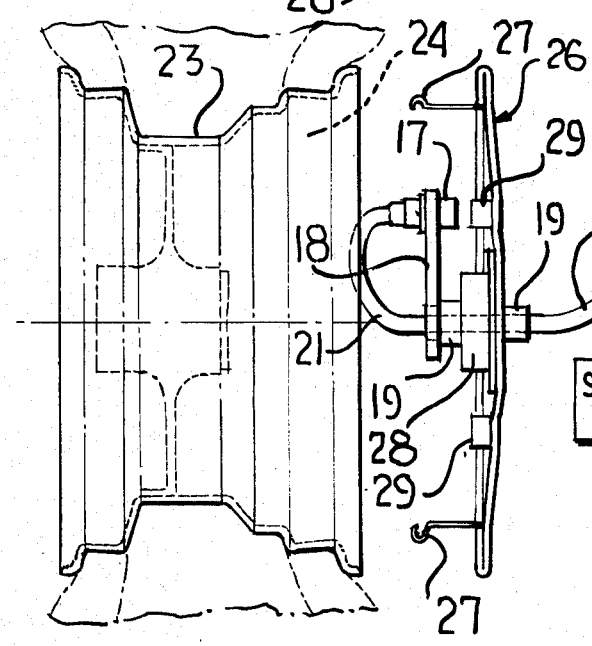
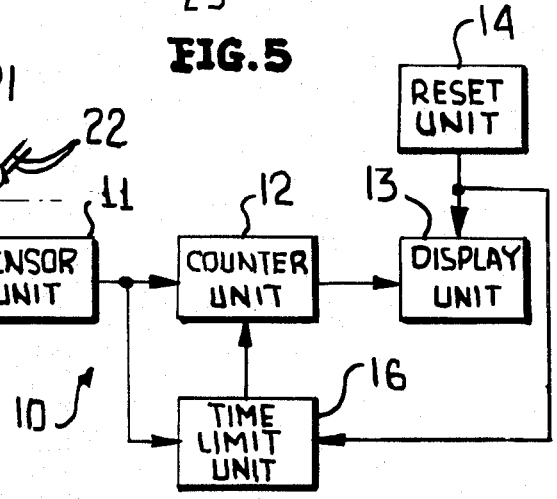
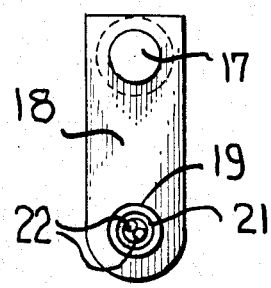
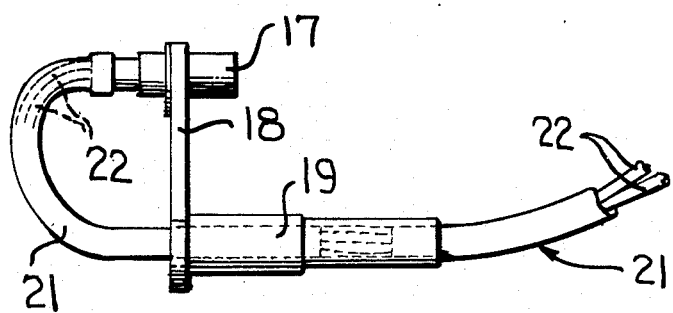

RECREATION VEHICLE DISTANCE MEASURING DEVICE

TECHNICAL FIELD

This invention relates generally to distance measuring devices for use with vehicles having ground contacting rotating wheels, and particularly to electric distance measuring devices.

BACKGROUND ART

Vehicles such as automobiles and trucks ordinarily include an odometer to indicate total mileage that has been traveled by the vehicle over its lifetime. Many such vehicles also include a secondary odometer known as a trip odometer. The trip odometer functions similarly to the primary odometer mentioned above, but may be reset to zero by the driver as so desired. As a result, a driver in such a vehicle can readily determine the distance from one place to another by proper manipulation of the trip odometer.

Not all vehicles are equipped with such a distance measuring device, however. In particular, many recreation vehicles, such as golf carts, provide only rudimentary transportation of passengers and related cargo. Nevertheless, many recreational activities that make use of such recreational vehicles can make valuable use of distance information to the extent that it can be provided. Generally, however, participants of such activities must rely on their ability to estimate distances by sight, on distance indicating markers, or on some portable means of roughly estimating distance, such as a pedometer (the latter, of course, defeating much of the purpose of utilizing a golf cart or other recreational vehicle).

There therefore exists a need for a distance measuring device that can be compatibly utilized with recreational vehicles. Since many such vehicles are already in existence, the device in question should be relatively easily retrofitted into existing vehicles in as unobtrusive and nondestructive a way as possible. Further, such a device must be simple to operate, relatively accurate, and sensitive to the limited on-board support capabilities of many recreational vehicles.

SUMMARY OF THE INVENTION

The above needs and others are substantially met through provision of the recreation vehicle mounted distance measuring device disclosed herein. This device operates in conjunction with a vehicle having at least one ground contacting rotating wheel (for propulsion, steering or support purposes), and includes a sensor unit, a counter unit, a display unit, a reset unit, and a time limit unit.

The sensor unit can include magnets that are mounted to rotate with the above noted wheel, and a magnetic field responsive sensor (such as a Hall effect sensor) that is substantially non-rotatably mounted proximal to the wheel, such that rotation of the wheel will periodically bring the magnets sufficiently close to the sensor to allow the sensor to sense such proximity. The sensor provides an electrical signal comprising a sensor signal in response to sensing each magnetic disturbance. In the embodiment described below, two magnets are mounted to rotate with the wheel, and hence the sensor will provide two sensor signals for each rotation of the wheel. The entire sensor unit, including the sensor and the magnets, can be comprised of a quickly and easily nonpermanently mountable structure, or can be permanently mounted if so desired.

The counter unit receives the sensor signals and maintains a count thereof. Through appropriate construction of the counter unit in view of the dimensions of the wheel being monitored, such a count can be used to provide an accurate indication of the distance traveled by the wheel, and hence the recreational vehicle associated therewith.

The display unit connects to the counter unit and provides a visible display of the count as converted into the desired units, such as feet, meters, yards, or the like. The display unit has associated therewith the reset unit, which allows the display and the count to be reset to zero and power to be applied to relevant circuitry through a bias network and timer such that a new distance can be measured.

The time limit unit responds to both the sensor signals and the reset unit. In effect, the time limit unit monitors for sufficient activity to justify maintaining the count and display operation. The latter activities of the device consume power, and since the device must often be powered by self contained batteries, power consumption must be carefully monitored. Therefore, if a sensor signal fails to appear within a predetermined period of time following receipt of a last-received sensor signal, the time limit unit will cause an associated timer to turn off appropriate related circuitry. The time limit unit responds to the reset unit to also cause the timer to reset so that the counting process can resume anew whenever the reset unit is activated by the operator of the vehicle.

Through provision of this device, a distance measuring device can be readily incorporated into existing recreational vehicles that provides accurate measuring capabilities, that is simple and reliable in use, and that is inexpensive to manufacture, install, and operate.

BRIEF DESCRIPTION OF THE DRAWINGS

These and other attributes of the invention will become more clear upon making a thorough review and study of the following description of the best mode for carrying out the invention, wherein:

FIG. 1a comprises a perspective view of a recreational vehicle equipped with the invention;

FIG. 1b comprises a perspective view of a golf bag carrier equipped with the invention;

FIG. 2 comprises a detailed side elevational view of the sensor unit in conjunction with a wheel from the vehicle;

FIG. 3 comprises a front elevational view of the sensor mounting arm;

FIG. 4 comprises a side elevational view of the sensor mounting arm;

FIG. 5 comprises a block diagram view of the invention; and

BEST MODE FOR CARRYING OUT THE INVENTION

Figure 6:
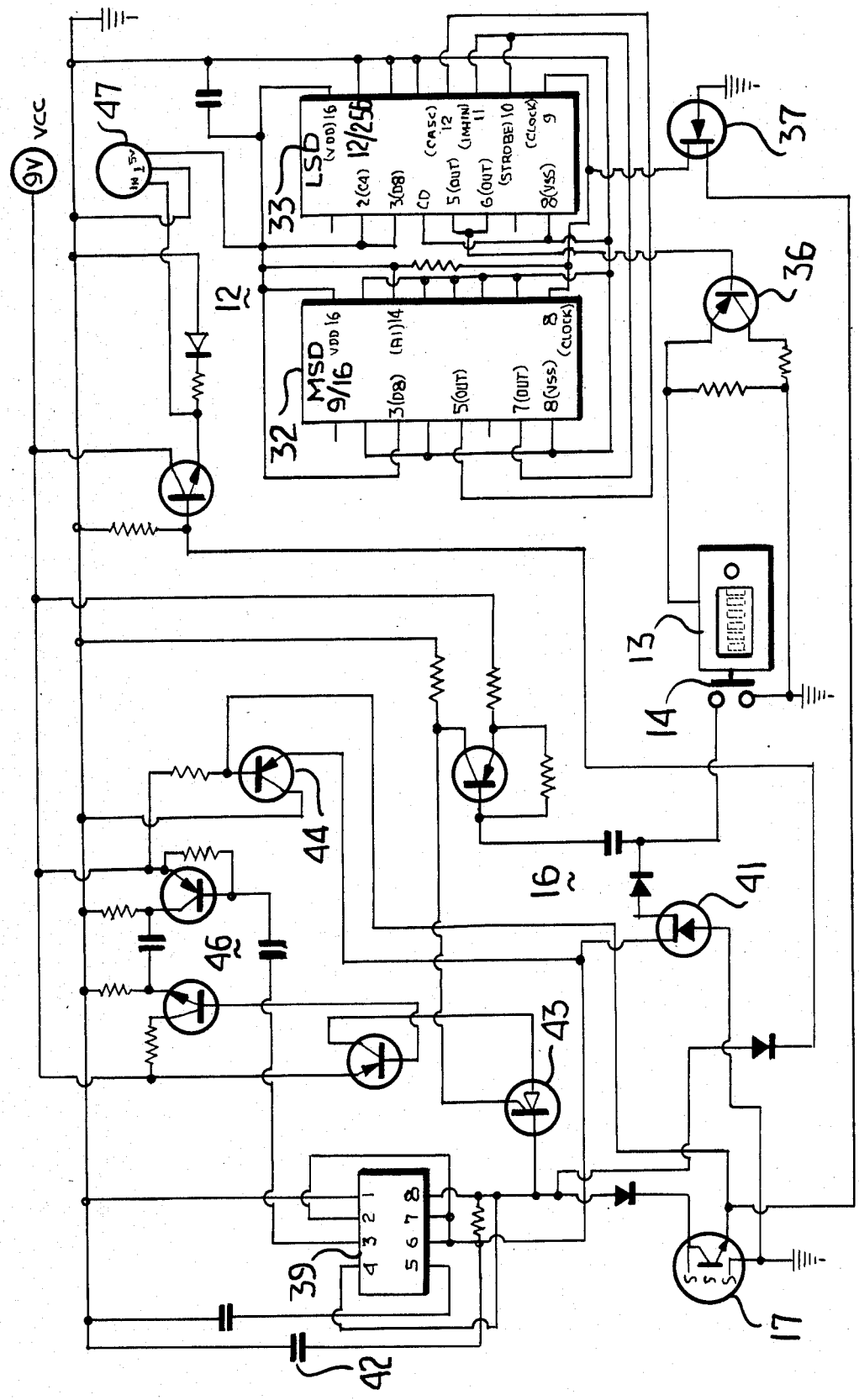
FIG. 6 comprises a schematic diagram of the invention.

Referring now to the drawings, and in particular to FIG. 5, the invention can be seen as depicted generally by the numeral 10. The invention 10 includes generally a sensor unit 11, a counter unit 12, a display unit 13, a reset unit 14, and a time limit unit 16. Each of the above generally referred to components will now be described in more detail in seriatim fashion.

With reference to FIGS. 3 and 4, the sensor unit 11 includes a sensor 17 (for example, a Hall effect sensor such as the Sprague 3020), a mounting arm 18, an axle 19, and a conduit 21. The axle 19 affixes to the mounting arm 18 and has a cavity formed therethrough to receive the conducting wires 22 of the sensor 17. The sensor 17 itself can be mounted through a hole provided therefor at one end of the mounting arm 18. The conduit 21 comprises a casing of plastic tube or the like for encasing the conducting wires 22 and for providing sufficient stability to the mounting arm 18 to prevent it from turning.

With reference to FIG. 2, a tire supporting wheel as associated with a recreation vehicle can be seen in part as depicted by the numeral 23. The wheel 23 includes a cavity 24 formed therein in accordance with well understood prior art technique.

With continued reference to FIG. 2, the sensor unit can be seen as generally depicted by the numeral 11. The sensor unit 11 includes a circular shaped plate 26 having clips 27 formed about the inside periphery thereof (only two clips 27 are shown for the purpose of clarity). So configured, the plate 26 can be moved into close proximity with the wheel 23, and the clips 27 will interact with the interior surfaces of the wheel 23 to cause the plate 26 to be nonpermanently affixed thereto. So mounted, the plate 26 will rotate as the wheel 23 rotates.

The plate 26 has a hole centrally disposed therethrough, and a bearing 28 mounted in close proximity to the hole such that the axle 19 of the sensor mounting arm 18 structure can be rotatably disposed therethrough. Finally, magnets 29 are mounted on the inside surface of the plate 26. For a golf bag carrier 30 as depicted in FIG. 1b, only two magnets 29, positioned 180 degrees apart, need be used. For a powered golf cart as depicted in FIG. 1b, three magnets 29 positioned 120 degrees apart should be used, to accommodate the difference in wheel circumference (the former having a typical circumference of 43.9 inches and the latter having a typical circumference of 54 inches). In the alternative, the magnets 29 may be mounted on the wheel 23 rim, in much the same way as wheel-balancing weights are attached to wheel rims. In either event, the magnets 29 are preferably mounted such that they will pass close to the sensor 17 when rotation of the plate 26 occurs.

With continued reference to FIG. 2, as the wheel 23 on the recreational vehicle turns, so also turns the plate 26 and the magnets 29 mounted thereon. The sensor 17, however, tends to remain in substantially one location (with respect to the axis of rotation), since rotation of the plate 26 does not cause commensurate rotation of the sensor mounting arm 18 structure, and the conduit 21 tends to cause the sensor 17 to remain stationary as depicted. Therefore, as the wheel 23 rotates, the magnets 29 will move past the sensor 17 in periodic fashion. This occasional proximity will be sensed by the sensor 17, and sensor signals will be carried by the conducting wires 22 provided to the remainder of the invention as set forth below.

With reference to FIG. 1a, it can be seen that the sensor unit 11 can be readily and easily mounted to a recreational vehicle 31, such as a golf cart, or even to a golf bag carrier 30 as shown in FIG. 1b.

Referring now to FIG. 6, the counter unit 12, the display unit 13, the reset unit 14, and the time limit unit 16 will now be described in detail.

The display unit 13 can be provided through use of a CUB 3 miniature electronic counter as manufactured by Red Lion Controls of York Pennsylvania. Such a display provides a six digit seven-segment display well suited to displaying the distance information contemplated by this device 10. This counter also includes an operator accessible reset switch to allow the display to be reset to zero, which switch comprises a part of the reset unit 14 for this invention. In addition, this counter includes a minor modification to allow closure of the reset switch to also provide a reset signal external to the counter for purposes disclosed in more detail below.

The counter unit 12 FIG. 6 includes two CD 4089 BCNs 32 and 33 cascaded in the add mode. Presuming a fourteen 14 inch wheel 23 on the recreational vehicle 31 (which comprises a standard sized wheel on a hand pulled golf bag carrier), the BCNs 32 and 33 can be configured to provide an internal most significant digit (MSD) of 9/16 0.5625 and a least significant digit (LSD) of 12/256 0.046875 for a sum total of 156/256 0.609375 per triggering event. This compares favorably with the 0.6107 yards that the vehicle 30 will traverse which each one-half rotation of the wheel 23. Each full rotation of the wheel 23 will therefore count as 1.2188, which approximates 1.22 yards. The BCNs 32 and 33 will provide a pulse to the display unit 13 each time the count equals or exceeds one 1, with the remainder being retained in memory to be added with the next incoming count information.

For example, after one revolution (equalling about 1.22 yards of travel), a count pulse will be provided to the display unit 13 (such that the display unit 13 will display "1") and a remainder of 0.22 will be left in the counter unit 12. With the next revolution of the wheel 23, the display unit 13 will indicate "2" and a remainder of 0.44 will await further processing. This process will continue until the remainder exceeds "1", at which time the remainder will also contribute a count pulse to the display unit 13. For instance, after five revolutions of the wheel 23, a remainder of 0.10 will exist and the display unit 13 will indicate a count of "6".

The BCNs 32 and 33 are configured as depicted in a relatively straight forward fashion to accomplish the above desired results. In addition, the following components may be used to complete the circuit. A 5 volt regulator 47 for local voltage regulation of the BCN's 32 and 33 can protect operation of the BCN's against varying battery voltages. A field effect transistor 37 can be provided to serve as an isolating switch for the clock ports pin 9 of the BCN's to bias and isolate the input from a reset transistor 44, and a properly biased transistor 36 can be used to increase the bias of the output ports pins 5 and 6 of the second BCN 33. These components accommodate the input requirements of the display unit 13. In addition, a 100K Ohm pull-up resistor 38 can be provided for the clock port pin 9 of both BCNs 32 and 33 to enhance the output of the sensor 17.

The remainder of the circuit depicted in FIG. 6 essentially comprises the time limit unit 16. This unit 16 includes a 555 timer 39 configured to provide a reset pulse to itself to extend the duration of the timing cycle as long as there is activity (i.e., movement of the monitored vehicle). When the activity stops, the timer 39 will allow continued provision of power to the count circuits for a short time (such as five minutes), which relates to an acceptable period of time to allow a player to execute his next shot, presuming he might be delayed by a lost ball or the like. Should additional distance measurement be desired during this time period, movement of the vehicle will allow additional incrementation of the count and automatic timer reset to allow an additional extension of the timing cycle without first resetting the count.

Triggering resetting of the timer 39 occurs through appropriate switching of a trigger transistor 44, which can be triggered by either a reset signal from the reset unit 14 (as properly biased through a biasing network 46) or by receipt of a sensor signal from the sensor 17. Once triggered, an SCR 43 switches on and provides power until the timing process terminates. The timing cycle will continue until a 220 microfarad capacitor 42 operably connected to the threshold port pin 6 of the timer 39 rises in potential sufficient to conclude the timing function.

The reset signal from the reset unit 14 also causes a FET 41 to ground the above noted capacitor 42 which in turn causes the timer 39 to reset itself and thereby extend the time cycle, which extensions will repeat in a similar manner until the pulses stop. Thus the timer 39 is caused to reset itself without causing the BCN's 32 and 33 to similarly reset (and thereby cause the count to be reset) through appropriate processing of sensor signals.

Configured as depicted, the memory of BCNs 32 and 33 will (presuming that the timer 39 has timed out) automatically be cleared by the absence of current and the new count will be initiated by a new first sensor pulse, which pulse will also trigger the timer 39. Presuming receipt of a second sensor signal before the timer 39 times out, the BCNs will then continue the counting process described above.

Those skilled in the art will appreciate that various modifications could be made as regards the above described embodiments without departing from the spirit of the invention. It should therefore be understood that the invention is not to be considered as being limited to the precise embodiments sent forth in the absence of explicit limitations directed to such features in the claims.

I claim:

1. A battery operated, self-contained distance measuring device for use with a recreation vehicle having a plurality of ground contacting rotating wheels, said device comprising:
   (A) sensor means for sensing rotation of at least one of said wheels and for producing sensor signals in response thereto;
   (B) counter means preprogrammed for responding to said sensor signals by incrementing a count related to rotation of said at least one wheel corresponding to a preselected standard distance measuring unit, and hence distance moved by said recreation vehicle;
   (C) display means incremented by said count of said counter means for continuously displaying said measure of said distance moved by said recreation vehicle in said preselected standard units;
   (D) reset means operable by an operator of said vehicle for causing said display means and said counter means to reset; and
   (E) time limit means interconnecting said counter with said battery and responsive to said sensor signals for providing power to said counter means so long as a next received sensor signal occurs within a predetermined period of time with respect to a last received sensor signal to thereby conserve power of said battery.

2. The distance measuring device of claim 1 wherein said sensor means includes:
   (A) magnet means mounted to rotate with said at least one of said wheels; and
   (B) sensing means for sensing rotational movement of said magnet means and for providing said sensor signals in response thereto.

3. The distance measuring device of claim 1 wherein said sensor means includes:
   (A) housing means for mounting to said at least one of said wheels;
   (B) magnet means mounted to said housing means for rotating with said wheel and for creating a magnetic field;
   (C) sensing means rotatably mounted to said housing means for sensing rotational movement of said magnet means and for providing said sensor signals in response thereto.

4. The distance measuring device of claim 3 wherein said housing means comprises a plate that affixes to said at least one of said wheels.

5. The distance measuring device of claim 4 wherein said plate has a hole axially formed therethrough, and wherein said sensor means includes:
   (A) an axle rotatably mounted through said hole;
   (B) a mounting arm affixed to said axle; and
   (C) said sensing means affixed to said mounting arm.

6. The distance measuring device of claim 5 and further including conduit means operably connected to said axle for urging said axle to remain substantially stationary and to not rotate with respect to said plate.

7. The distance measuring device of claim 3 wherein said magnet means includes two magnets mounted substantially 180 degrees apart from one another on said housing means.

8. The distance measuring device of claim 3 wherein said magnet means includes three magnets mounted substantially 120 degrees apart from one another on said housing means.

9. The distance measuring device of claim 1 wherein said display means can display a measure having up to six digits.

10. The distance measuring device of claim 1 wherein said time limit means includes a timer for measuring said predetermined period of time.

11. The distance measuring device of claim 10 wherein said timer comprises a 555 timer.

12. A battery operated, self-contained distance measuring device for use with a recreation vehicle having a plurality of ground contacting rotating wheels, said device comprising:
   (A) sensor means for sensing rotation of at least one of said wheels and for producing sensor signals in response thereto;
   (B) counter means preprogrammed for responding to said sensor signals, including:
      a first counter incremented by said sensor signals for providing most significant digit count information; and
      a second counter incremented by said sensor signals for providing least significant digit count information;
      such that said counter means provides one output pulse when the combined count information for said first counter and second counter at least equals said preprogrammed value corresponding to a predetermined standard measurement unit of distance moved by said recreation vehicle;

(C) display means incremented by said output pulse from said counter means for continuously displaying a measure of said distance moved by said recreation vehicle in said preselected measurement units;

(D) reset means operable by an operator of said vehicle for causing said display means and said counter means to reset; and (E) time limit means interconnecting said counter with said battery and responsive to said sensor signals for providing power to said counter means so long as a next received sensor signal occurs within a predetermined period of time with respect to a last received sensor signal thereby conserving power of said battery.

* * * * *